(12) United States Patent
Barton et al.

(10) Patent No.: US 6,535,253 B2
(45) Date of Patent: Mar. 18, 2003

(54) ANALOG VIDEO TAGGING AND ENCODING SYSTEM

(75) Inventors: James M. Barton, Los Gatos, CA (US); Howard Look, Mountain View, CA (US)

(73) Assignee: TiVo Inc., Alviso, CA (US)

(*) Notice: Subject to any disclaimer, the term of this patent is extended or adjusted under 35 U.S.C. 154(b) by 0 days.

(21) Appl. No.: 09/790,067

(22) Filed: Feb. 21, 2001

(65) Prior Publication Data

US 2001/0017892 A1 Aug. 30, 2001

Related U.S. Application Data

(63) Continuation of application No. 09/187,967, filed on Nov. 6, 1998, now Pat. No. 6,215,526.

(51) Int. Cl.[7] .................................................. H04N 7/08
(52) U.S. Cl. ........................ 348/473; 348/460; 348/461; 348/465
(58) Field of Search ................................. 348/473, 460, 348/469, 476, 478, 465, 461, 463, 467, 398.1, 421.1; 375/240.11, 240.2; H04N 7/08

(56) References Cited

U.S. PATENT DOCUMENTS

| 4,807,031 | A | * | 2/1989 | Broughton et al. | ......... 348/460 |
|---|---|---|---|---|---|
| 5,440,345 | A | * | 8/1995 | Shimoda | ..................... 348/411 |
| 5,566,089 | A | * | 10/1996 | Hoogenboom | ............... 395/114 |
| 5,587,743 | A | * | 12/1996 | Montgomery et al. | ....... 348/473 |
| 5,719,634 | A | * | 2/1998 | Keery et al. | ................. 348/463 |
| 5,809,160 | A | * | 9/1998 | Powell et al. | ................ 382/100 |
| 6,094,228 | A | * | 7/2000 | Ciardullo et al. | ............ 348/473 |
| 6,211,919 | B1 | * | 4/2001 | Zink et al. | ................... 348/473 |
| 6,229,572 | B1 | * | 5/2001 | Ciardullo et al. | ............ 348/473 |
| 6,239,843 | B1 | * | 5/2001 | Gaudreau | .................... 348/465 |
| 6,286,061 | B1 | * | 9/2001 | Ross | ............................ 710/33 |

OTHER PUBLICATIONS

The Illustrated Dictionary of Electronics, Seventh Edition, 1997, by Stan Gibilisco, p. 28.*

* cited by examiner

Primary Examiner—John Miller
Assistant Examiner—Jean W. Désir
(74) Attorney, Agent, or Firm—Glenn Patent Group; Michael A. Glenn; Kirk D. Wong

(57) ABSTRACT

An analog video tagging and encoding system. The invention inserts an analog tag frame into the analog video stream such that the luminance values are made to approach zero, i.e., black, allowing a potential tag frame to be quickly identified. Tag information is then encoded as a structured color pattern into the chrominance portions of the frame and contains program start/stop information, program segment identification, or data downloads. The color pattern is chosen such that when it is converted into digital form according to the Moving Picture Experts Group (MPEG) standard, the digital signal so produced may be easily and minimally parsed to recognize the presence or absence of a tag within a normal frame time period.

20 Claims, 16 Drawing Sheets

Extraction from perfectly registered slice
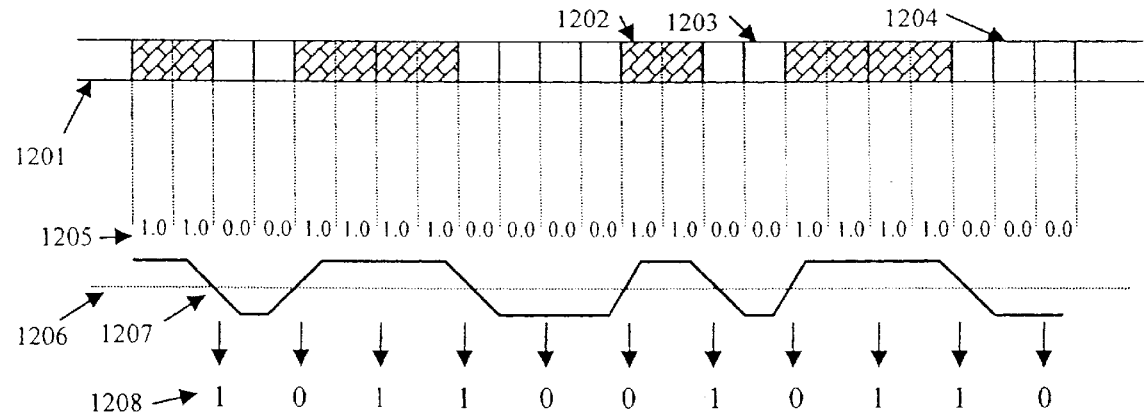
Extraction from slice with worst registration error
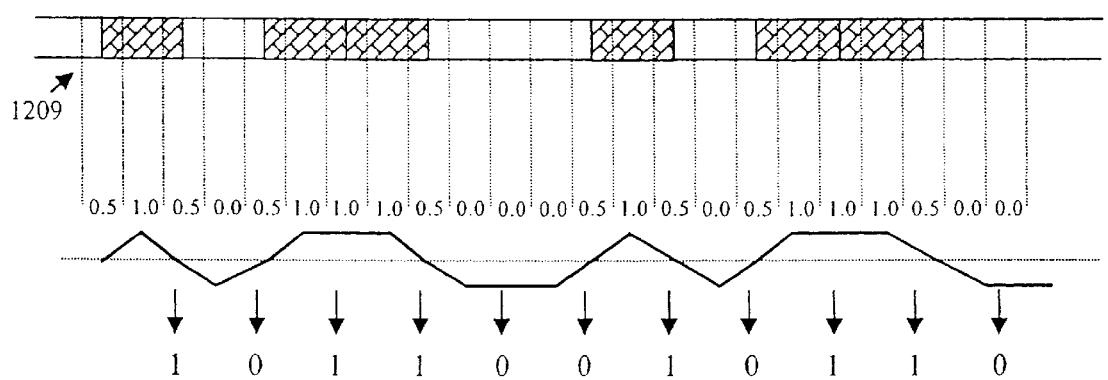
Extraction from slice with moderate registration error
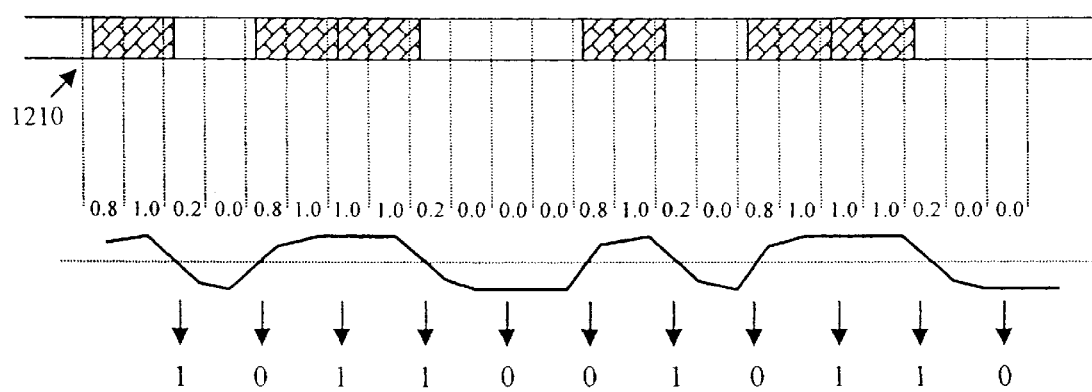
FIG. 12 Extracting the tag from the MPEG bitstream

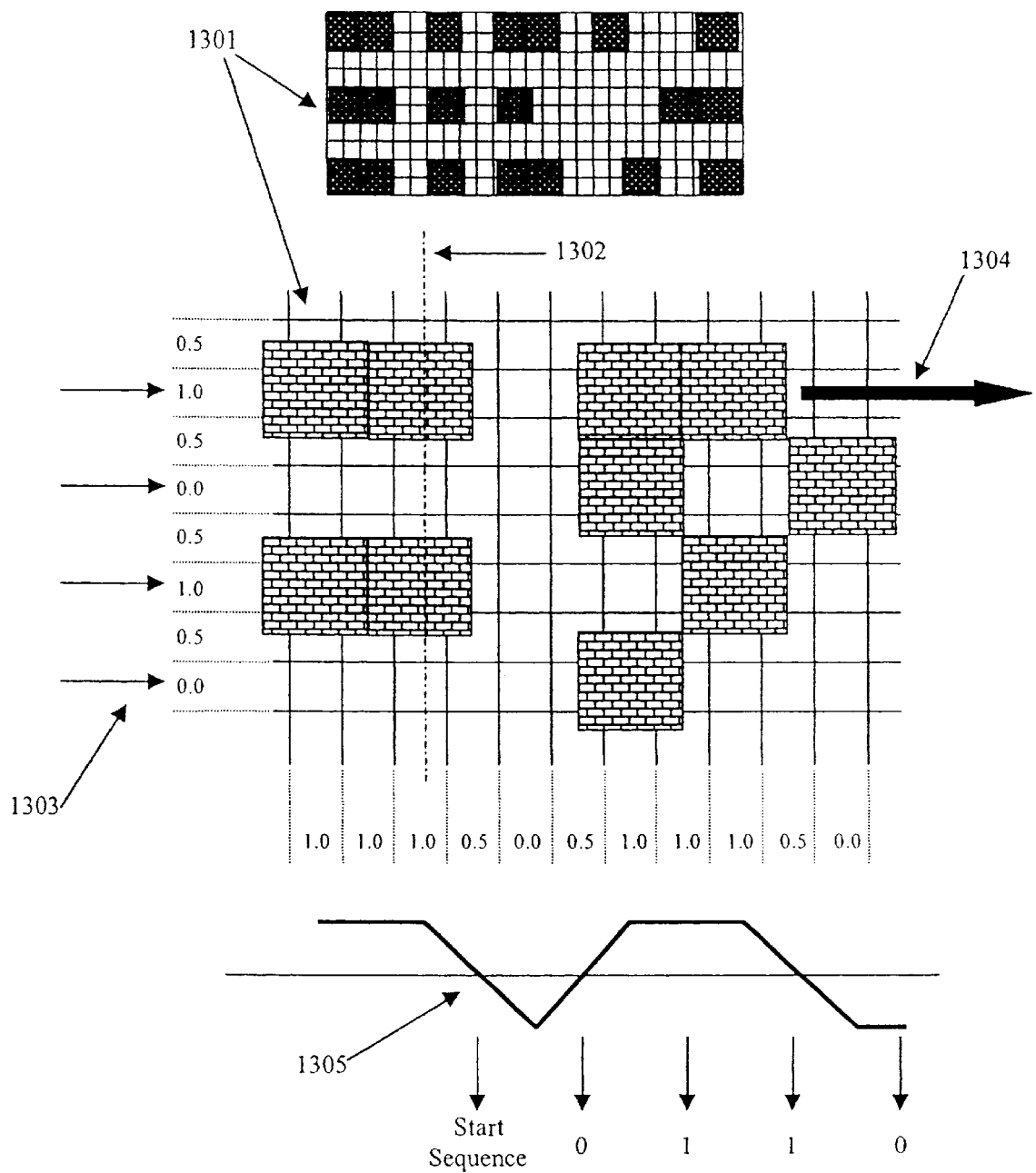
FIG. 13 Example of Two Dimensional Registration of the Tag Data

ANALOG VIDEO TAGGING AND ENCODING SYSTEM

This is a continuation of application Ser. No. 09/187,967, filed Nov. 6, 1998, now U.S. Pat. No. 6,215,526.

BACKGROUND OF THE INVENTION

1. Technical Field

The invention relates to the encoding of data into analog television broadcast signals. More particularly, the invention relates to the in-band encoding of informational data into an analog television broadcast signal.

2. Description of the Prior Art

A large percentage of consumers now own Video Cassette Recorders (VCR). Almost every one of those consumers have encountered a common problem when recording broadcast programs. A consumer will set her VCR to record a television program that is either live or pre-recorded. The program is delayed or is broadcast early for some reason and the VCR records only a portion of the desired program.

The classic example concerns live broadcast programs such as boxing matches or football games. Boxing matches are notoriously known for unpredictable ending points. It is common for boxing matches to end unexpectedly because of an early knockout. Football, as well as baseball, games are delayed due to weather or extended because of overtime play. It is all too common for the last few moments of a game to be cut off when a consumer is recording it because the VCR is time based and ends the recording at a preset time.

The current approach of broadcast video recording uses time as the basis for the start/stop capture of programs. This is acceptable assuming: 1) there is an accurate time base available; 2) the data about start and stop times are accurate; and 3) the actual transmission of the program matches its stated transmission time. Even so, program guide times are accurate only to the minute, so precise capturing is difficult. In fact in such cases consumers may start capture early and end late to insure getting everything.

It would be far better if the program material included a "tag" directly within it indicating when a program begins or ends. Thus, it would be possible to capture programs with "frame accuracy," i.e., with sufficient precision to capture the program beginning with the first frame of the program and ending with the last frame. Such a tag might include identifying information, or in fact any information of interest. In fact, the tag could mark any event of interest in the program, not just the beginning or ending of the program. For example, the beginnings and/or endings of commercial advertisements or special segments of the program might be so tagged.

The typical approach is to embed the tag into the Vertical Blanking Interval (VBI) of a succession of frames in the program. However, this approach does not guarantee that the VBI information will remain intact after transmission. The VBI is not considered part of the program material, so during the preparation and transmission of the program, the VBI may be modified in arbitrary ways. The only way to insure frame-accurate tagging using the VBI is to insert it directly into the program content at the last stage before transmission. This is difficult to achieve and expensive because it requires special equipment to be maintained at the broadcaster's site which can precisely identify the proper insertion points in the transmitted program and has available the full plurality of data that might be inserted. It is also difficult to manage because broadcasters must use a consistent format and notation for identical programs.

Similarly, the tag might be encoded into the audio portion of the signal. The audio signal is treated separately from the video portion through all stages of the preparation and transmission process, so it suffers from many of the weaknesses of VBI encoding. Further, audio encoding can only be accomplished by modifying the signal significantly so that the tag can be reliably retrieved, which results in unsatisfactory degradation of the final sound. Alternatively, a long time period can be used to send the tag, allowing minimal degradation of the audio signal, but this time period far exceeds the maximum latency required to achieve frame-accurate tagging.

A rich set of examples can be found in methods implementing automated broadcast verification systems, which use tagged video to trigger various mechanisms which record the tag for later reporting. Such systems are typically used for verifying that advertisements have been properly broadcast. A weakness of these systems is that the tag is usually out-of-band, placed either in the VBI, as described in U.S. Pat. No. 4,805,020 issued to Greenberg on Feb. 14, 1989, or in the audio portion of the signal, as described in U.S. Pat. No. 4,945,412 issued to Kramer on Jul. 31, 1990. These techniques suffer from the problems noted above.

Additionally, broadcast verification systems provide a rich source of examples for implementing in-band tagging. These typically break down into two approaches: signature recognition, in which the received signal is processed using various techniques to produce a "signature," which is stored for later comparison with the original source signal; and embedding information into the signal by slightly modifying the signal. Signature recognition methods rely on comparison with a central database of signatures, which is infeasible within the scope of this invention. Embedding methods are computationally complex and expensive, and often fail in the face of normal transformations that occur during the transmission process.

It would be advantageous to provide an analog video tagging and encoding system that gives the programmer the ability to encode data in-band into the analog video stream at any point during the preparation and transmission process. It would further be advantageous to provide an analog video tagging and encoding system that utilizes a tagging approach that survives the changes that occur during the transmission process, including conversion to and from analog and digital television formats, and allows frame-accurate capture upon reception.

SUMMARY OF THE INVENTION

The invention provides an analog video tagging and encoding system. The invention provides a robust tagging system that encodes in-band data into an analog video broadcast signal. In addition, the invention allows frame-accurate capture of video frames upon reception.

A preferred embodiment of the invention uses the standard process of conversion of analog television signals to digital television signals in the Moving Picture Experts Group (MPEG) format to allow detection and capture of encoded tags. An analog tag frame is inserted into the analog video stream such that the luminance (Y) values are made to approach zero, i.e., black, allowing a potential tag frame to be quickly identified. Tag information is then encoded as a structured color pattern into the chrominance (Cb and Cr) portions of the frame, making the tag itself invisible to the casual viewer. The tag information can contain program start/stop information, program segment identification, or data downloads. The color pattern is chosen such that when it is converted into digital form according to the MPEG standard, the digital signal so produced may be easily and minimally parsed to recognize the presence or absence of a tag within a normal frame time period.

In a simple embodiment of the invention, the structured analog color pattern may appear as a pattern of colored blocks aligned with the macroblock segmentation performed on the analog signal by the MPEG encoding process. This causes the DC component of the encoded Cr and Cb macroblocks to precisely reflect the color pattern. The simplest color pattern uses two colors with extremely different Cr or Cb values, and derives a binary encoding sequence where a binary zero (0) might be represented by values near one color, and a binary one (1) represented by values near the other color. This is easily extended to create a number of different chrominance levels within each encoded macroblock, allowing multiple bits of tag information to be encoded by each macroblock. The number of chrominance levels available for data encoding are limited by the transmission accuracy and color distortion caused by the transmission process.

Another embodiment of the invention provides a method whereby "trimming" of the analog signal (i.e., truncation of the signal in the vertical or horizontal direction during transmission) has no effect on the ability to derive the tag from the encoded frame. A window is selected within the tag frame such that the size of the window is known to most likely fit within a trimmed frame and transmitted in its entirety. The tag information is redundantly encoded within or outside the window to guarantee that no portion of the tag information is omitted whenever the frame is transmitted.

Square colored blocks of a multiple of the macroblock size are used such that a phase encoding is achieved which is easily detected during a single pass over the MPEG bitstream. Both the Cr and Cb layers may be encoded in this fashion. If the resulting pattern generated by the difference function were visible to the naked eye, it might appear as a checkerboard-like pattern of various colors.

The MPEG encoding process attempts to remove redundancy from the encoded signal to achieve a more compact digital representation of it. This is done by fully encoding a particular frame as a reference frame (an MPEG I, or Index, frame), and then for a number of successive frames transmitting only the differences between the current frame and the reference frame. It is desirable that all information needed to extract a tag be present within a single frame to simplify implementation and lower cost, yet it is not normally possible to guarantee that the MPEG encoder always generates an I-frame for each tag frame.

To insure that all tag data is present, the tag frame is preceded and possibly followed by "reset" frames which are exactly opposite from the tag frame, forcing the MPEG encoder to generate all macroblocks for the tag frame, regardless of whether the current frame is an I-frame or not.

Other aspects and advantages of the invention will become apparent from the following detailed description in combination with the accompanying drawings, illustrating, by way of example, the principles of the invention.

BRIEF DESCRIPTION OF THE DRAWINGS

FIG. 12 is a schematic diagram of the extraction of a tag from an MPEG bitstream according to the invention;

FIG. 13 is a block schematic diagram of an example of the registration of tag data from a tag field according to the invention;

DETAILED DESCRIPTION OF THE INVENTION

The invention is embodied in an analog video tagging and encoding system. A system according to the invention provides an analog video tagging and encoding system that allows the user to encode informational data in-band into an analog video data stream. The invention additionally provides a tagging method that survives the changes to the video frame format that occur during the transmission process.

Figure 1:
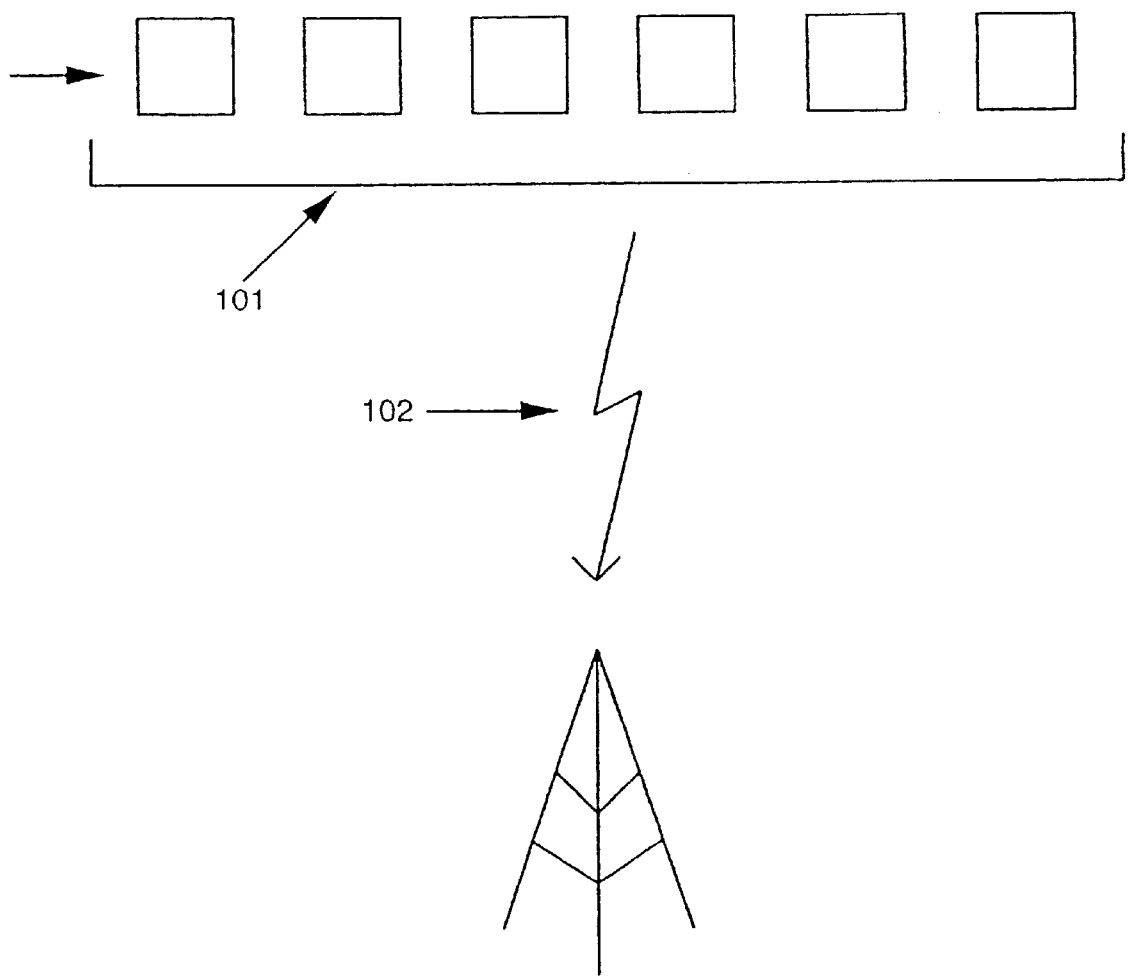
FIG. 1 is a block schematic diagram of an analog broadcast signal according to the invention.

Referring to FIG. 1, an analog broadcast video signal 101 appears as a sequence of fields or frames. The video signal 102 can be sent over cable, satellite, airwaves, or a Video Cassette Recorder (VCR) in National Television Standards Committee (NTSC) or PAL broadcast formats. The invention adds a tag to the analog video signal in-band that indicates the start and end points of the program as well as other information. Since audio frames are independent of video frames, the tag is preferably added to the video sequence and can be created by the program producer. A frame or field is added in-band into the content that, when sent:

1. Is invisible to the viewer (i.e., it is black) or is at least visually acceptable to the viewer.
2. Survives conversion transitions from analog to Moving Pictures Experts Group (MPEG) and MPEG to analog.
3. Is a highly structured visual image within the frame and, when encoded into MPEG, is easily parsed.
4. Survives the production through transmission chain, e.g., broadcasters sometimes trim the video frame, resulting in fewer lines or pixels.

5. Enables frame accurate capture of a sequence of video fields or frames.

Figure 2:
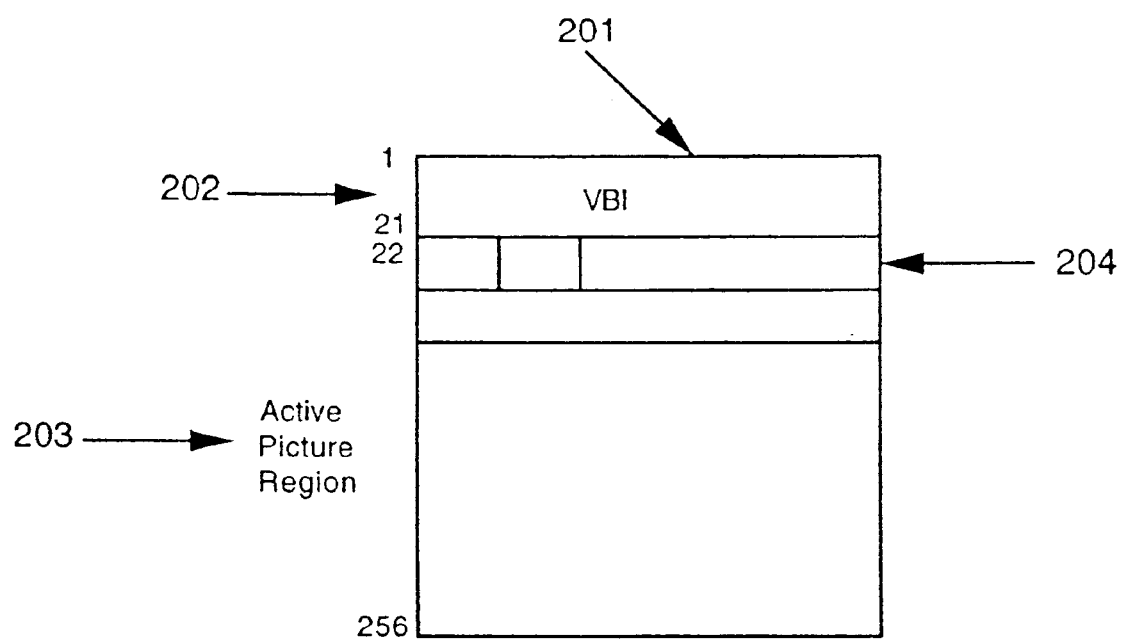
FIG. 2 is a schematic diagram of a frame in an Moving Pictures Experts Group (MPEG) stream according to the invention.

With respect to FIG. 2, a stream of NTSC video is structured in fields 201. Each field 201 contains Vertical Blanking Interval (VBI) information 202 in video lines 1–21. Lines 22–256 contains the active picture region 203. The active picture region 203 is structured as sequential horizontal lines containing a fixed number of pixels for each line. An MPEG encoder processing this analog signal separates groups of lines from the signal into a series of horizontal slices 204. Each slice 204 is further separated into a sequence of square blocks, called macroblocks, that are 16 pixels by 16 lines in size. The resulting MPEG bitstream is thus composed of a sequence of fields, each of which is composed of a sequence of slices, each of which is composed of a sequence of encoded macroblocks, along with control, sequencing and framing information. The methods described herein operate interchangeably on fields of an interlaced signal (such as NTSC video) or on frames of a progressive signal (such as the output of a normal computer monitor), thus the terms "Yield" and "frame" are used interchangeably; the only effective difference for the purpose of this invention is that more tag data may be carried within a single frame, whereas there are typically twice as many fields in an interlaced signal.

Figure 3:
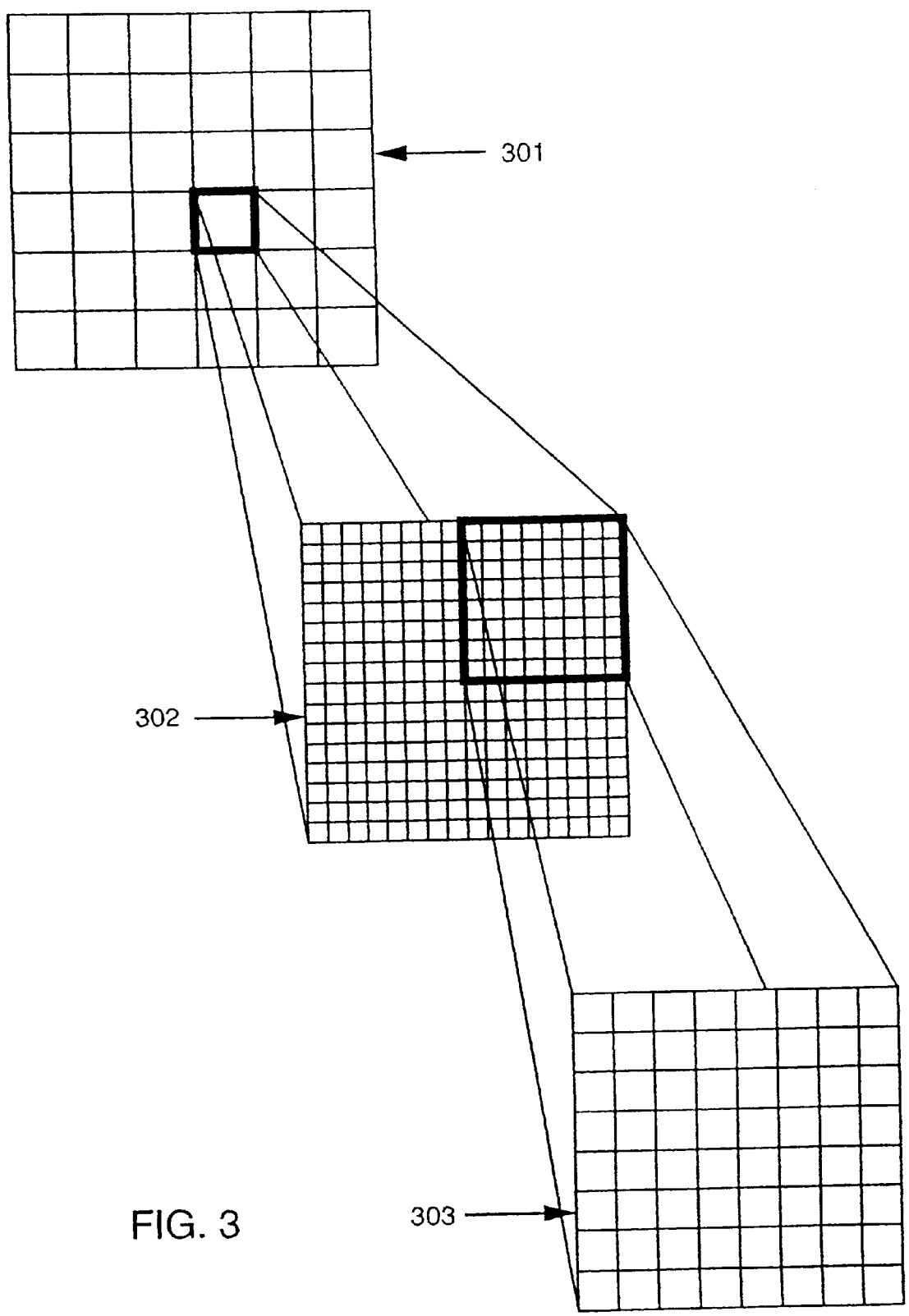
FIG. 3 is a block schematic diagram of the partitioning of an active picture region into macroblocks according to the invention.

Referring to FIG. 3, the active picture region of each field 301 is thus divided into a rectangular array of macroblocks 302. Each 16×16 macroblock 302 is further subdivided into four 8×8 blocks 303.

MPEG2 uses the three-pane color space called YCbCr color space where Y represents the luminance (brightness) value and Cb and Cr represent the chrominance values. Cb is represented by a blue difference function while Cr is represented by a red difference function. A black and white field is composed of a single array of Y macroblocks. A color field is created by adding two overlayed macroblock arrays, one representing the Cb values and one representing the Cr values. The human eye is less sensitive to color information then brightness information, so a full video signal often contains much less chrominance then luminance information, allowing the bandwidth of the resulting bitstream to be reduced. The MPEG2 encoding standard supports 4:2:0, 4:2:2, and 4:4:4 sampling, which respectively correspond to minimal, typical and complete amounts of supplied color information. Within the encoded MPEG2 bitstream, the chrominance macroblocks are interleaved into the sequence of luminance macroblocks such that they immediately follow the luminance information with which they are associated.

Figure 4:
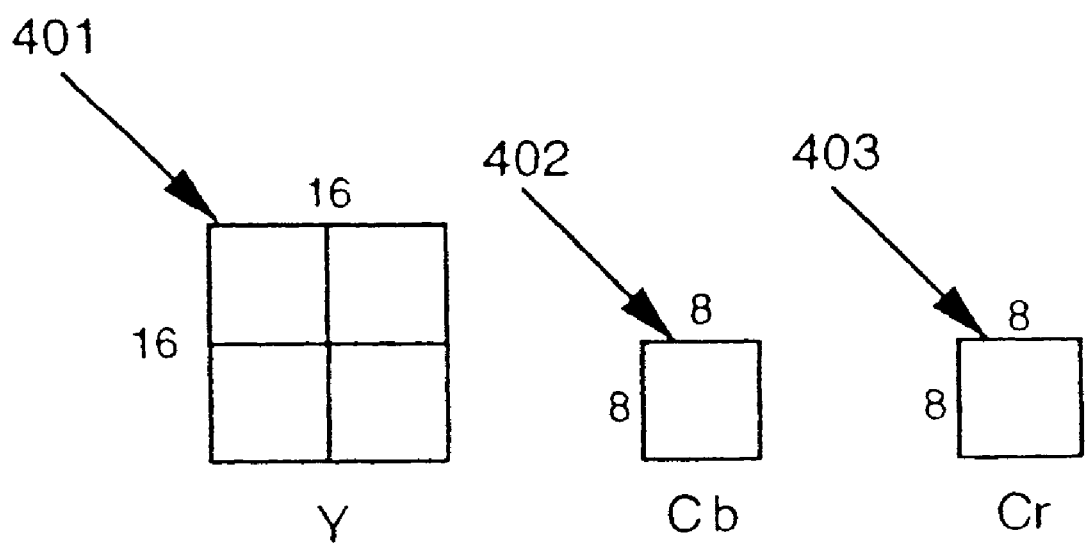
FIG. 4 is a block schematic diagram of the layout of a 4:2:0 macroblock according to the invention.

With respect to FIG. 4, a complete 4:2:0 macroblock is shown. The 4:2:0 macroblock consists of four Y blocks 401, one Cb block 402, and one Cr block 403. Each block is 8×8 bits in size.

Figure 5:
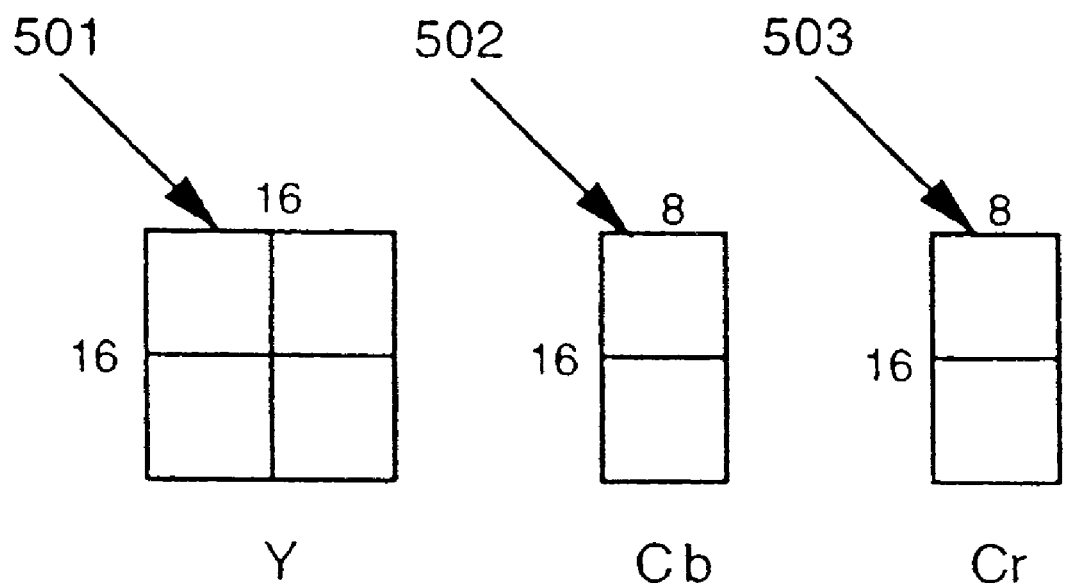
FIG. 5 is a block schematic diagram of the layout of a 4:2:2 macroblock according to the invention.

Referring to FIG. 5, a 4:2:2 macroblock comprises four Y blocks 501, two Cb blocks 502, and two Cr blocks 503, thus it has twice the color information of a 4:2:0 macroblock.

Figure 6:
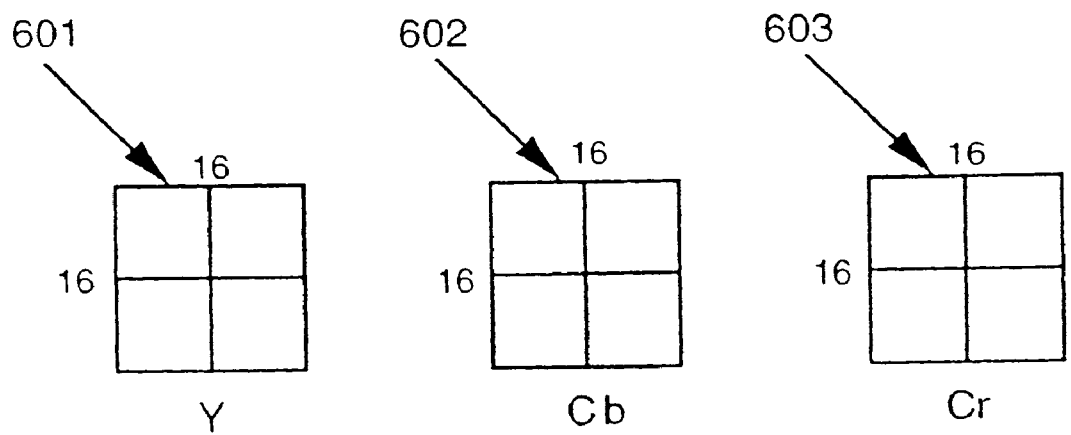
FIG. 6 is a block schematic diagram of the layout of a 4:2:4 macroblock according to the invention.

With respect to FIG. 6, the 4:4:4 macroblock consists of four Y blocks 601, four Cb blocks 602, and four Cr blocks 603, providing the maximal color information.

Figure 7:
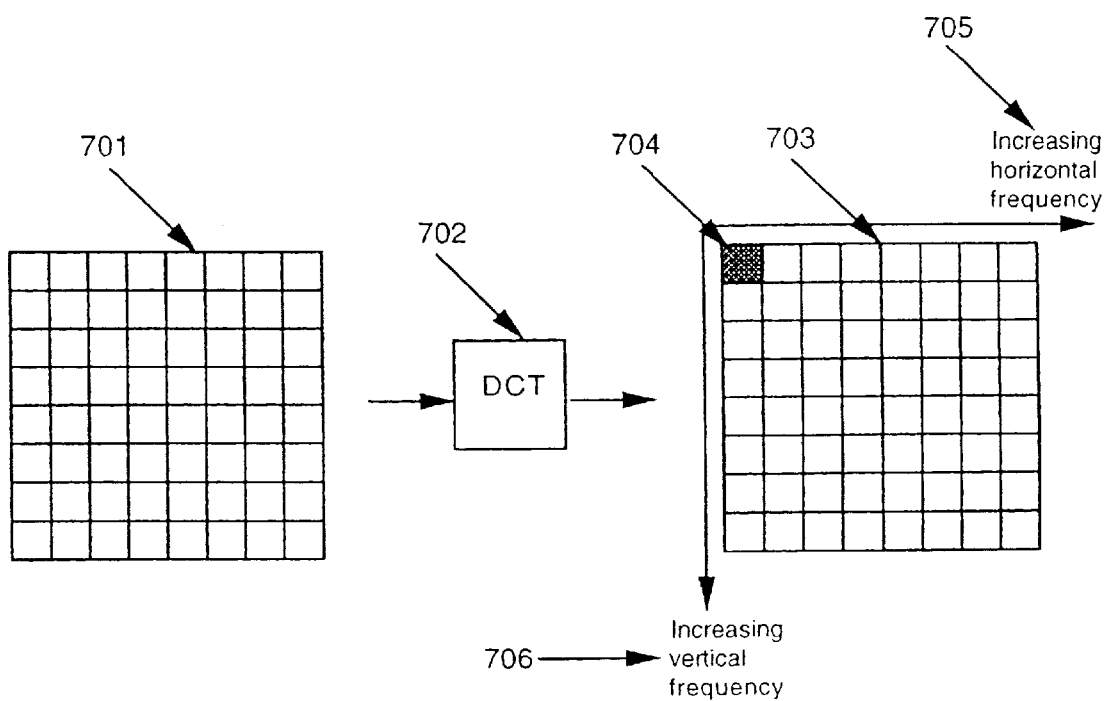
FIG. 7 is a block schematic diagram of the Discrete Cosine Transform (DCT) of an 8×8 block according to the invention.

Referring to FIG. 7, a Discrete Cosine Transform (DCT) 702 is performed on the 8×8 blocks 701 to generate a frequency matrix 703. The frequency matrix 703 contains horizontal 705 and vertical 706 frequency coefficients. The frequency coefficients above the DC coefficient 704 are called AC coefficients. The DC coefficient 704 represents the fundamental frequency of the block, and remains stable throughout the transformation process.

Figure 8:
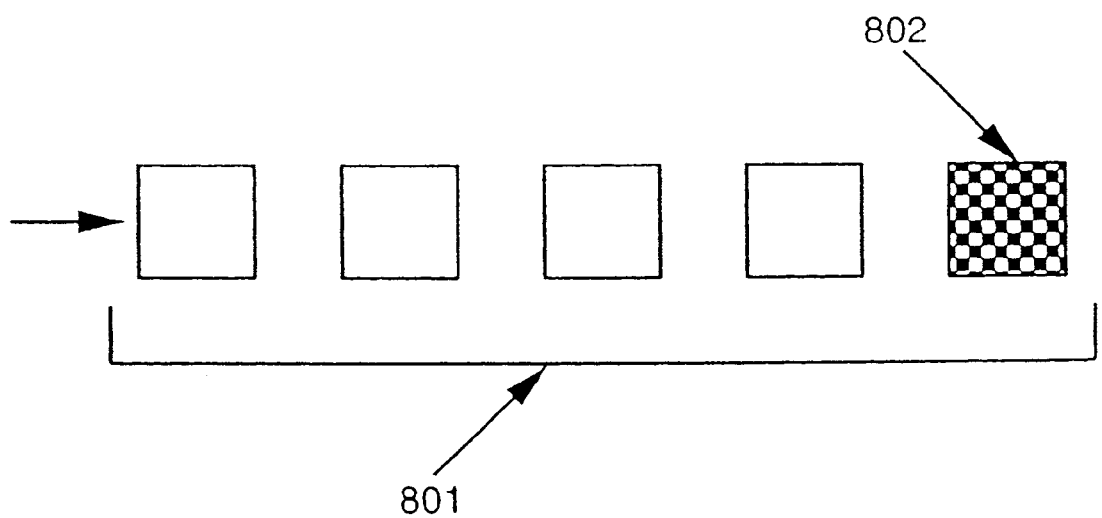
FIG. 8 is a block schematic diagram of a tag frame inserted into a video stream according to the invention.

With respect to FIG. 8, the invention takes, for example, an NTSC video stream 801 and encodes data in-band into the stream. One frame or field 802 is added to the data stream such that the luminance (Y) values in the active picture region are made to approach zero, i.e., black. This causes the TV set to not turn on the gun in the picture tube and the frame or field is not visible to the viewer (except as a short period of black), but still carries tag information.

Tag information is then encoded into the Cb and/or Cr DC values. The Cb and Cr DC values are varied to encode bits into the frame. The DC coefficients are varied for the Cb and Cr values within each macroblock because the Y values are saturated to achieve the black field.

The DC coefficient is directly encoded into the stream according to set rules in the MPEG2 standard, thus a hardware parser can be easily used to scan the stream for black frames, trigger an event, and extract the chrominance DC coefficient values. The controller software can then examine these values for tag data.

Advertisements, or commercials, are usually inserted into the video stream with "bumper" frames of black to avoid confusing the viewer. The hardware parser can therefore also identify commercial breaks automatically, triggering software actions to delete or overlay commercials, if desired.

One way of hardware assisted parsing for a black frame is to provide a limit register that defines the minimum differential value to be considered "black." The parser maintains a counter, and increments it each time a black block in the luminance layer of a field is parsed. If the counter exceeds a predetermined value when the field has ended, then an event is generated indicating the black frame and the software may parse the field at its leisure.

Figure 9:
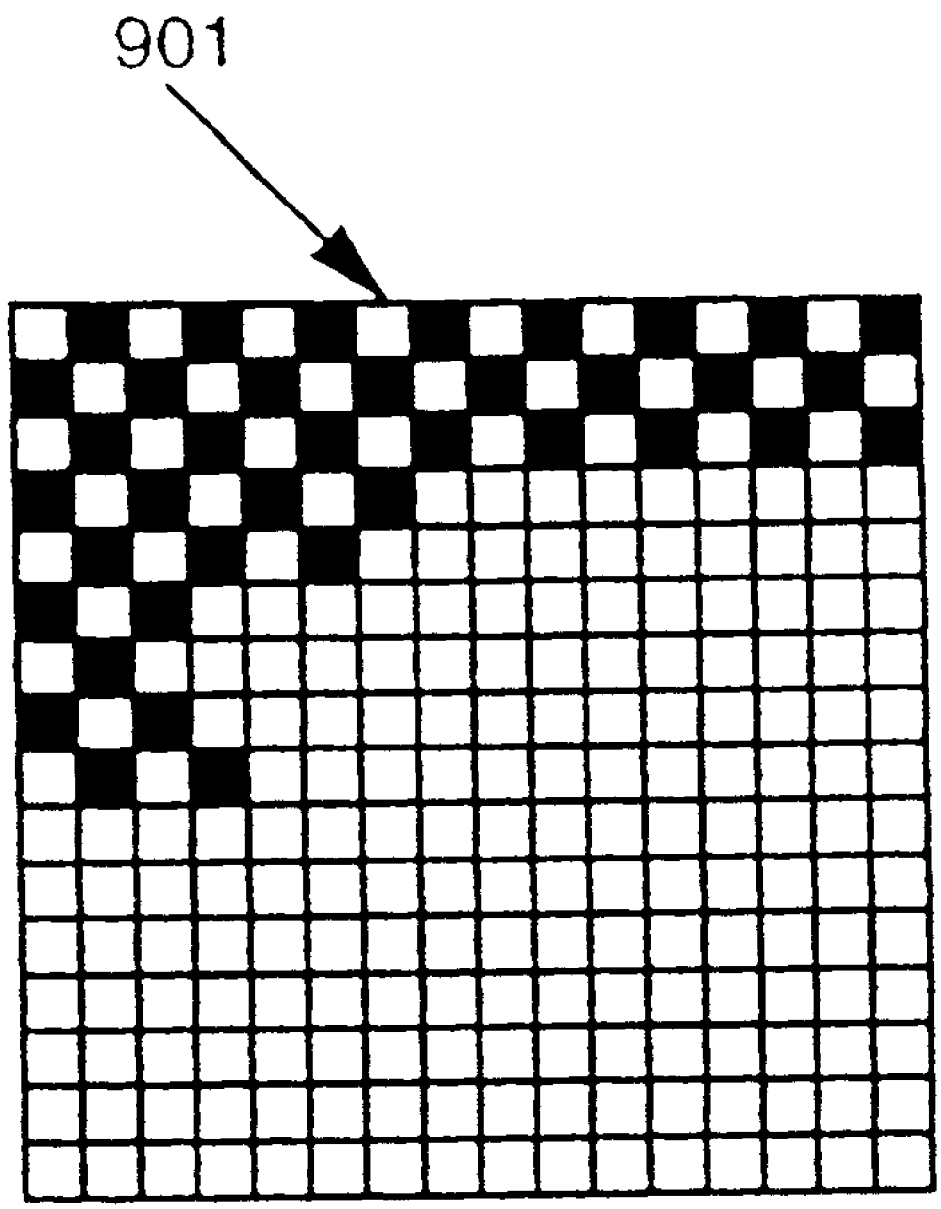
FIG. 9 is a block schematic diagram of the placement of encoded macroblocks within a tag frame according to the invention.

Referring to FIG. 9, the data encoding technique must survive various artifacts of video handling in the chain. A preferred embodiment of the invention places block-sized single color images in the frame 901 aligned to macroblock boundaries, in a checkerboard fashion. Each square corresponds to one bit of data.

In a simple embodiment of the invention, two binary values can be encoded in each Cr and Cb macroblock. The DC values can vary between 0 and 2048. For example, the Cr value can be varied to full red saturation (1) or no red (0). If a threshold of 0 to 1023 is used to represent 0 and 1024 to 2048 represents 1, then using the full on or off values allows the thresholds to be easily met. This approach will survive all of the signal translations.

This can be extended to create more levels and therefore more bit patterns. For example, four colors are used to encode four states (00, 01, 10, 11). Eight color partitions may be used to represent the states 0 through 7. The ranges would be:

0–256=000
257–512=001
513–768=010
769–1024=011
1025–1280=100
1281–1536=101
1537–1792=110
1793–2048=111

The number of bit representations are limited by the transmission accuracy and the transformation processes which distort the colors. Generally, fewer choices allow for wider ranges that define a state. As noted above, the bit information can be doubled by using both Cr and Cb layers.

It would be attractive to also use the AC coefficients of the DCT transform for encoding data. These coefficients each represent a frequency component of the macroblock; by careful choice of the video elements that are encoded, the values of the frequency coefficients can be made to fall within predictable ranges. Therefore, the same digitization strategy used for encoding into the DC components can be applied to each AC component, starting from a simple binary encoding using the maximal and minimal values and extending through multilevel encoding.

However, the AC coefficients are not used because they have been run-length and Huffman encoded and must be decoded before the tag data can be extracted, which creates additional processing overhead. However, as technology advances, the processing overhead will decrease and the AC coefficients may also be used to hold tag data.

Figure 10:
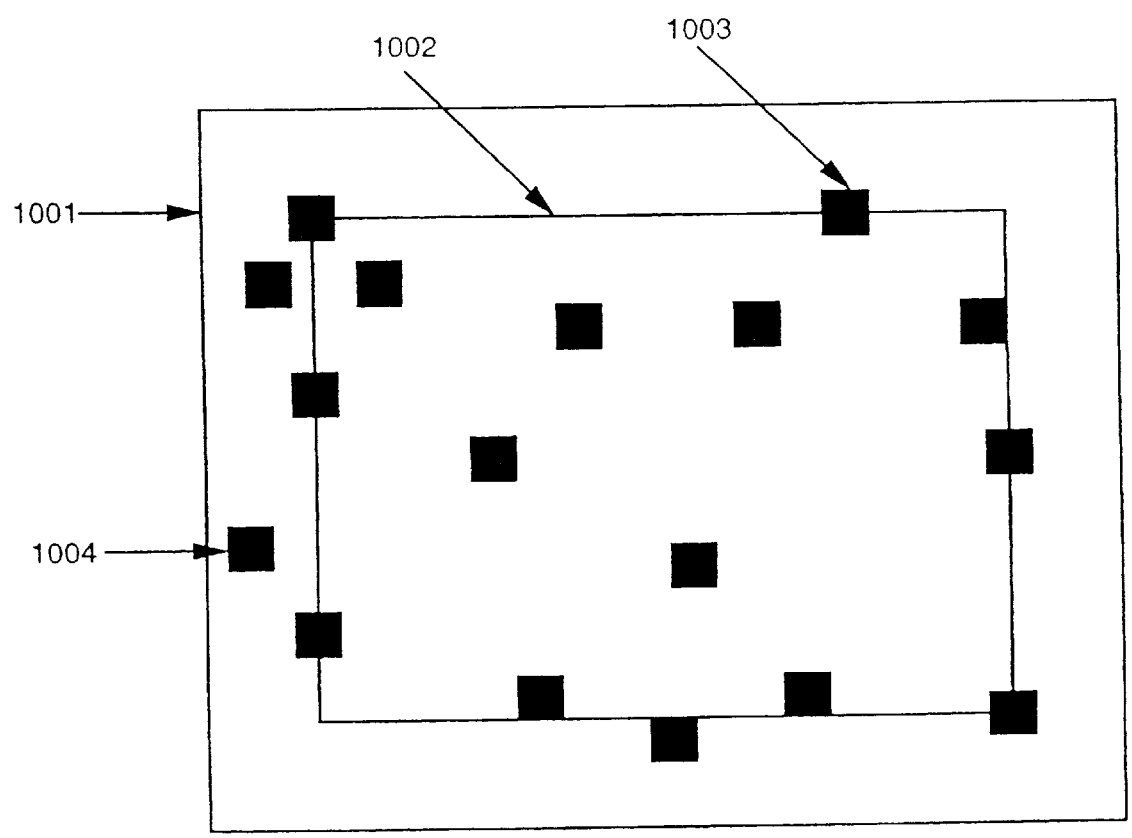
FIG. 10 is a block schematic diagram of the effects of a compressed frame according to the invention.

With respect to FIG. 10, there are many different transformations that occur during the hierarchy of flow from production through reception of the program content. For example, broadcasters will often transmit modified fields 1002. The original fields 1001 will be trimmed in a vertical or horizontal direction, resulting in a smaller frame 1002. The checkerboard pattern 1003 may not align in a 1:1 fashion with the macroblock pattern and certain portions of the pattern may be omitted entirely 1004.

Figure 11:
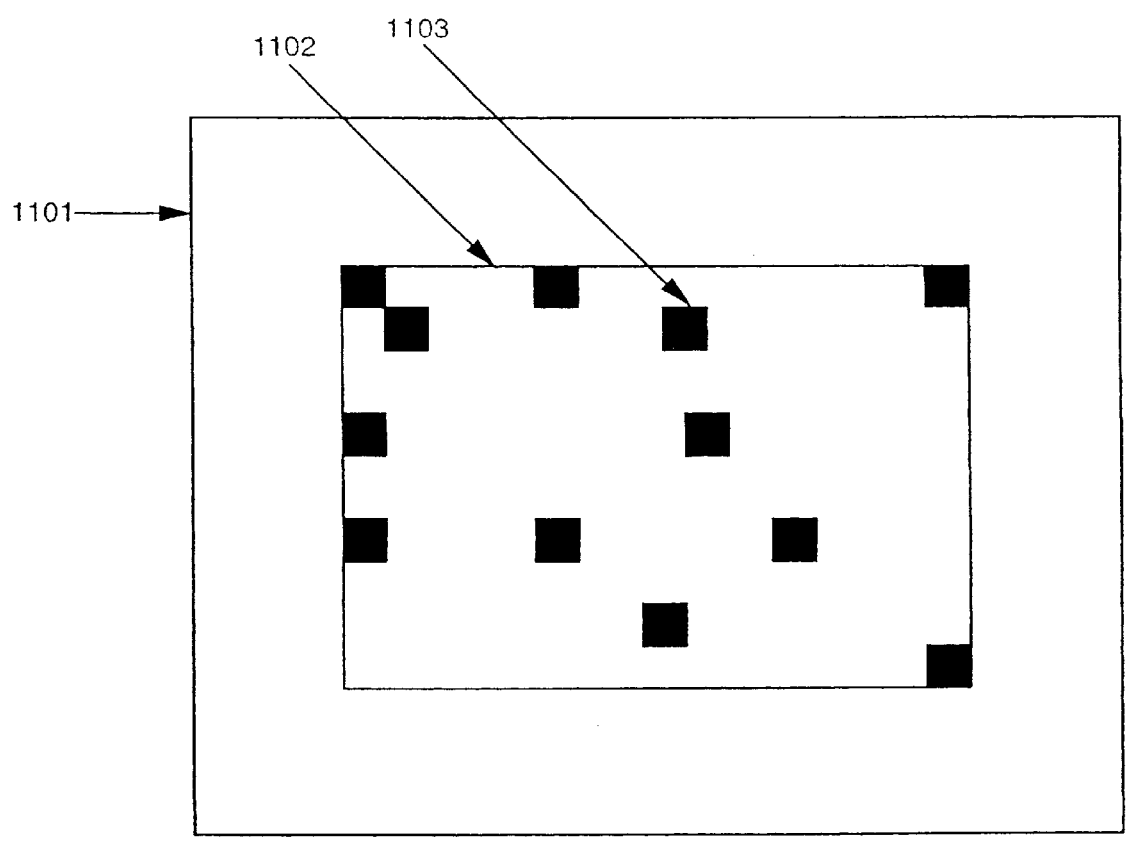
FIG. 11 is a block schematic diagram of a window selected within a frame to contain encoded data according to the invention.

Referring to FIG. 11, a window 1102 is selected within the analog field 1101. The size of the window 1102 is chosen such that it is known to most likely fit within a compressed field and be transmitted in its entirety. The tag information 1103 is redundantly encoded within the minimum window 1102 of the analog field 1101. This is to guarantee that no portion of the tag information 1103 is omitted whenever the field 1101 is compressed.

The window can be either inclusive or exclusive, i.e., data can be encoded either inside or outside of the window. For example, "real" video can be tagged in the overscan region. The overscan region is the part of the picture that the viewer does not see because TV manufacturers tune the TV to overscan the signal such that the edges are off-screen, thereby reducing artifacts. This method also applies to encoding data in the black regions in letterbox video format.

With respect to FIG. 12, it is generally not possible to achieve alignment between the source checkerboard pattern represented in the analog signal and the macroblock slicing chosen by the MPEG encoder. However, embedded tag data may still be extracted if each block of the checkerboard pattern is instead a rectangle of two macroblocks in size.

A perfectly registered field is one encoded from the analog video stream 1201 with perfect alignment between the checkerboard color pattern and the encoded macroblocks 1204 produced from the MPEG encoding process. This results in the DC component of a macroblock representing a binary "1" 1202 being near the maximum, while the DC component of a macroblock representing a binary "0" 1203 being near the minimum. A series of values 1205 is generated by summing the previous DC differentials for each position to generate the sequence of DC components; for brevity, we represent the full range of possible DC component values as mapped to the range 0.0 to 1.0, i.e., minimum DC component value to maximum value.

When these values are plotted 1207, a graph results which is familiar to those skilled in the art of binary data transmission. When the middle value 1206 (0.5 in this example) is crossed it is called a "phase change", and represents a transition between values; a high-to-low change indicates a "1" bit is present, a low-to-high changes indicates a "0" bit is present. Starting with the first phase change, we sample the DC component every other macroblock. If it does not represent a phase change, then another bit of the same value as the previous bit must be present. Thus, the tag can be extracted from the image with a single pass over the bitstream.

This works well if a registration error occurs in the slice scanning direction, however it fails if a vertical registration error is also present. Referring to FIG. 13, a method is shown which properly handles both vertical and horizontal registration error. A regular pattern of maximally colored blocks is applied horizontally 1301 outside the data window 1302, forming an array of stripes. Each stripe is two macroblocks high, and extends into the window 1302 by at least one macroblock. Between each maximally colored stripe is a stripe of minimally colored macroblocks of the same size.

In this method, vertical registration is achieved first. This is done by examining the DC component of the first macroblock in each slice. Each slice is examined in turn until a maximum DC component value is detected; this indicates that this slice begins a tag data slice. The next slice is ignored, the following slice will be a tag data slice, the following slice is ignored, and so on, thus every other slice is a tag data slice 1303. Each tag data slice 1304 is then registered horizontally as described above. An initial phase shift 1305 to indicate that valid data follows is provided by including a two-macroblock gap of minimal DC component value before the data encoding pattern.

As previously noted, the MPEG bitstream is composed of a series of fields, slices, macroblocks and blocks. Within a slice, the MPEG standard specifies a technique of transmitting the DC values of macroblocks as the difference from the DC value of the preceding macroblock. This further reduces the bandwidth required, as these differences may often be represented with fewer bits in the signal.

Figure 14:
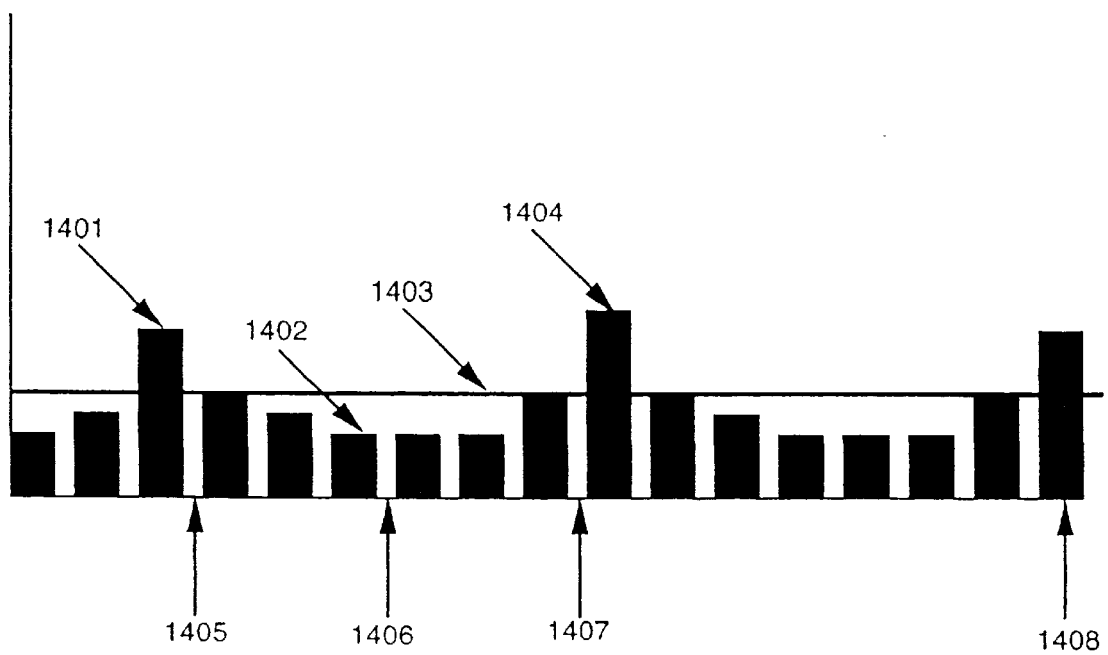
FIG. 14 is a schematic diagram of a rectangular shaped checkerboard pattern used for creating a reference clock according to the invention.

With respect to FIG. 14, the rectangular checkerboard pattern will generate small DC differentials 1402 interspersed with large DC differentials 1401 when it is encoded into MPEG. The invention uses this knowledge to eliminate the need to maintain a sum of the previous differentials in the slice to calculate the current DC components. Instead, the data are extracted by recording the phase changes in the differential, i.e., when the differential crosses a certain fixed value 1403. In this example, 1405 and 1407 indicate phase changes when two states are used. As noted above, this method is easily extended to multiple states, or colors, to improve data density.

This method is efficient, because it allows determination of a tag field or frame, extraction of a reference clock, and extraction of data bits in a single, linear pass over the MPEG encoded data.

Another problem that occurs is dependent upon the state of the MPEG encoder.

The MPEG encoder may generate an I, B, or P frame for the tag frame. Only I-frames can guarantee that all blocks of the frame are present. The B and P frames delete blocks and instead use motion vectors indicating where certain blocks from the previous field should be moved to in the current field, which further reduces the bandwidth required. In some cases, the changes between two fields are too drastic to be efficiently encoded within a motion field. In these cases, the MPEG standard specifies that the encoder should emit a "scene change" event into the MPEG bitstream, and produce a complete field instead of a motion field. Unfortunately, different encoders may implement this requirement using different thresholds, or perhaps not implement it at all. In order for the invention to insure that all blocks are present in a tag frame, an additional step may be added.

Figure 15:
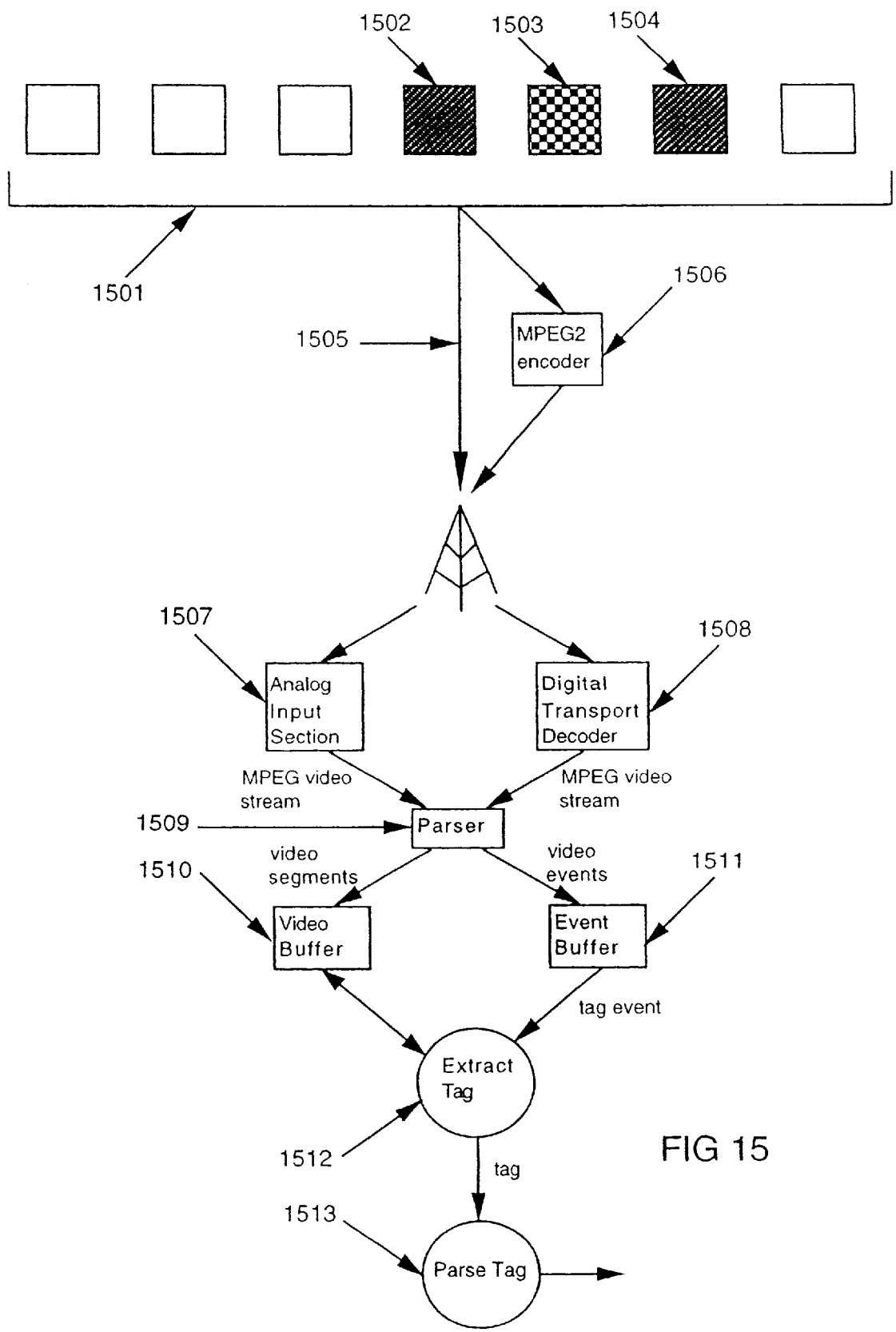
FIG. 15 is a block schematic diagram of the decoding of a tag frame within a video stream according to the invention.

Referring to FIG. 15, a preferred embodiment of the invention forces the generation of an I-frame by preceding the tag frame 1503 with a "reset" frame 1502 in the program stream 1501. The reset frame 1502 is generated as a total opposite image of the tag frame 1503. This forces the MPEG encoder to generate every block in the frame, since no motion is detected. A reset frame 1504 may also follow the tag frame 1503 because a B-frame is encoded b y looking both forward and backward in the stream, and certain encoders may still perform motion compensation steps even though a scene change has been forced. The two or three-frame sequence can be added at the beginning, end, or any point within the program stream.

One skilled in the art will readily appreciate that additional, well known techniques can be applied to the tag data to enhance its accuracy, capacity, and security. For example, a parity-based recovery technique (SECDED or Reed-Solomon) can be used to recover from bit errors. Lossless compression techniques can be used (LZW) to enhance capacity. Secret-key or public-key encryption may be applied to secure the data, if appropriate.

It should also be obvious that multiple tag frames can be used in sequence to carry more data. In addition, these encoding techniques may be applied to the luminance layer as well if visual artifacts are acceptable, thereby increasing the data density.

Tag frames do not need to be sequential; the decoding device can buffer data from tag frames that are widely dispersed in time and merge the extracted data-bits together to form larger data objects such as software downloads, copyright information, or other data objects.

The analog video stream is transmitted in analog form 1505 or converted to MPEG format 1506 before or during transmission. The MPEG conversion can, for example, occur within a satellite uplink for digital TV. The received signals are sent to the corresponding analog input section 1507 or digital transport decoder 1508. The resulting MPEG stream is sent to the Parser 1509.

The Parser 1509 parses the incoming video stream for black frames and places the video frames into the Video Buffer 1510. A limit register is preset that defines the minimum differential value to be considered "black." The Parser 1509 increments a counter each time a black block in the luminance layer is parsed and generates an event in the Event Buffer 1511 when the counter exceeds the predetermined value after the frame has been completely parsed.

The Extract Tag module 1512 receives the event from the Event Buffer 1511. It then verifies that the frame is an actual tag frame, extracts the tag values from the frame, if valid, and sends the tag values to the Parse Tag module 1513. The Parse Tag module 1513 distributes the tag values to the proper data handlers for example, start/stop capture, program segment identification, copyright verification, or a data downloader.

Frame accuracy is achieved by buffering a number of frames in the Video Buffer 1510 such that the processor can start the capture with a frame that has already passed, or stop the capture at a frame that is not part of the program. This has the effect of allowing higher latencies in the device, thus lowering costs. An example of an apparatus that takes advantage of the frame latency is described in Barton et al., Appl. No. 09/126,071, owned by the Applicant.

Figure 16:
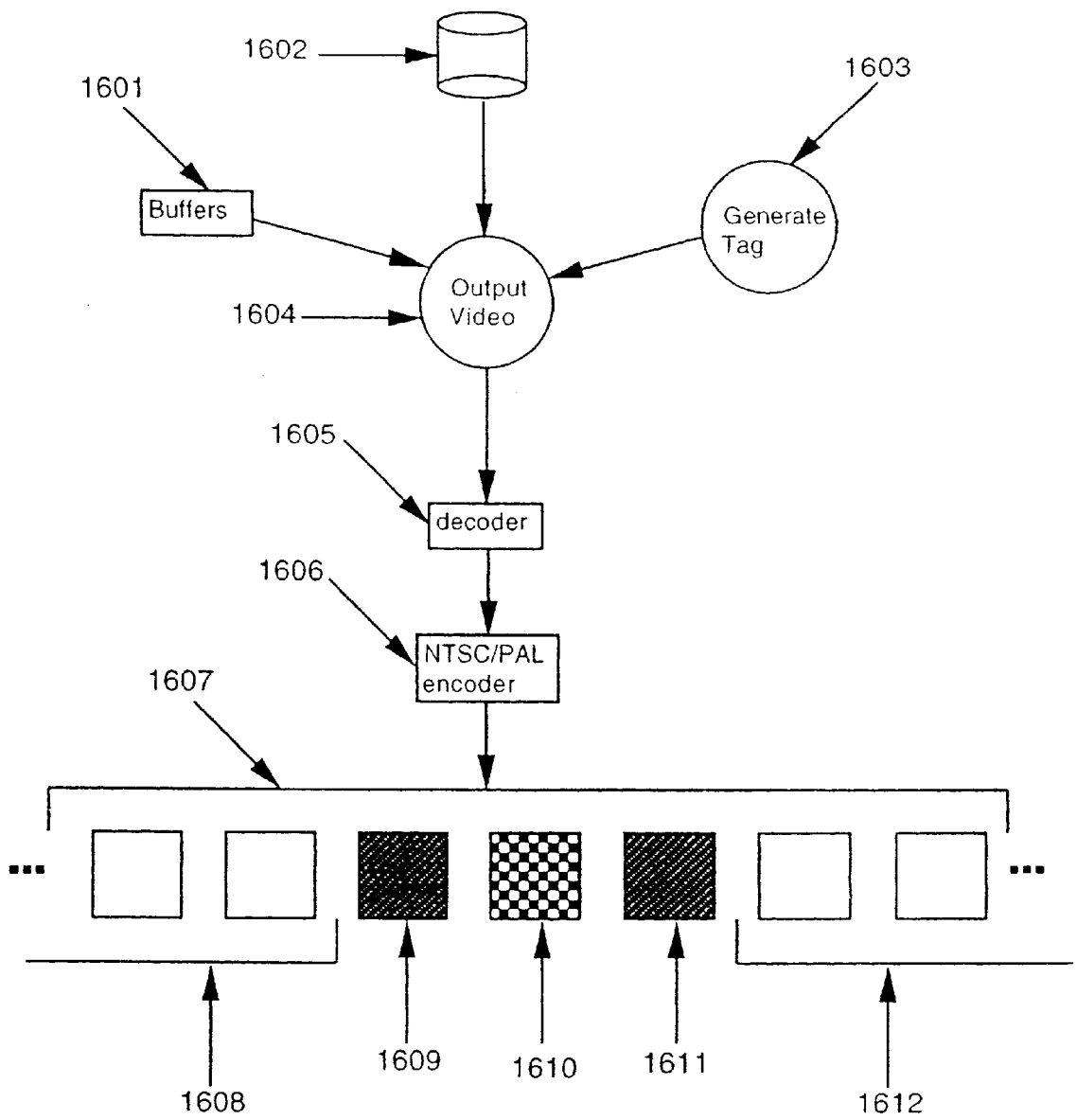
FIG. 16 is a block schematic diagram of the encoding of a tag and reset frame sequence into a video stream according to the invention.

With respect to FIG. 16, an example of a tagging system is shown. The Generate Tag module 1603 fills in a pre-computed MPEG stream representing a tag frame template with the desired data. This stream contains all of the blocks, although it may appear as an I, B, or P frame to the decoder 1605. Reset frames 1609, 1611 are provided because there is no guarantee of I-frame alignment when the analog video is re-encoded on input; the templates for these are also pre-computed.

When the Generate Tag module 1603 issues a tag frame, it encodes the tag into reserved spots in the template, generates complimentary values into reserved spots in the reset frame template, and passes the resulting two or three-frame MPEG sequence through the Output Video module 1604 to the decoder 1605 for analog output 1606. The Output Video module combines the video frames from the storage device 1602 or buffers 1601 with the tag and reset frames passed to it by the Generate Tag module 1603. The three-frame sequence is inserted anywhere into the program stream 1607. In this example, the reset frames 1609, 1611 and the tag frame 1610 are inserted between the end of one program 1608 and the beginning of another program 1612.

When this technique is used in conjunction with the apparatus described in Barton et al., Appl. No. 09/126,071, for archiving a program to a VCR, the tag is guaranteed to be perfectly recoverable; there is no generational degrading of the tag.

One skilled in the art will readily appreciate that, although analog video streams have been specifically referred to in the description, the invention is easily applied to digital video streams as well.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for encoding in-band data into analog video signals that is preserved through the transmission and digital conversion process in a computer environment, comprising the steps of:

providing video encoding means for encoding in-band data into an analog stream;

transmitting said encoded analog stream;

receiving said encoded analog stream at a receiver;

providing digital signal conversion means for converting said encoded analog stream into a formatted digital video stream;

providing data extraction means for decoding and extracting said in-band data from said formatted digital video stream;

wherein said video encoding means inserts and encodes tag frames into said analog stream;

wherein said data extraction means identifies said tag frames; and wherein said data extraction means decodes and extracts said in-band data from said tag frames.

2. The process of claim 1, wherein said video encoding means precedes said tag frame with a reset frame, said reset frame is generated as a total opposite of said tag frame.

3. The process of claim 1, wherein said video encoding means fills in a pre-computed digital stream template representing a tag frame with some or all of said in-band data.

4. The process of claim 1, wherein said tag frames enable frame accurate capture.

5. The process of claim 1, wherein said data extraction means buffers a number of frames while decoding thereby allowing the use of said in-band data in a frame accurate manner.

6. A process for encoding in-band data into analog video signals that is preserved through the transmission and digital conversion process in a computer environment, comprising the steps of:

providing video encoding means for encoding in-band data into an analog stream;

providing digital signal conversion means for converting said encoded analog stream into a formatted digital video stream;

transmitting said formatted digital video stream;

receiving said formatted digital video stream at a receiver;

providing data extraction means for decoding and extracting said in-band data from said formatted digital video stream;

wherein said video encoding means inserts and encodes tag frames into said analog stream;

wherein said digital signal conversion means converts said analog stream before or during said transmitting step;

wherein said data extraction means identifies said tag frames; and wherein said data extraction means decodes and extracts said in-band data from said tag frames.

7. The process of claim 6, wherein said video encoding means precedes said tag frame with a reset frame, said reset frame is generated as a total opposite of said tag frame.

8. The process of claim 6, wherein said video encoding means fills in a pre-computed digital stream template representing a tag frame with some or all of said in-band data.

9. The process of claim 6, wherein said in-band data enables frame accurate capture.

10. The process of claim 6, wherein said data extraction means buffers a number of frames while decoding thereby allowing the use of said in-band data in a frame accurate manner.

11. An apparatus for encoding in-band data into analog video signals that is preserved through the transmission and digital conversion process in a computer environment, comprising:

video encoding means for encoding in-band data into an analog stream;

a module for transmitting said encoded analog stream;

a module for receiving said encoded analog stream at a receiver;

digital signal conversion means for converting said encoded analog stream into a formatted digital video stream;

data extraction means for decoding and extracting said in-band data from said formatted digital video stream;

wherein said video encoding means inserts and encodes tag frames into said analog stream;

wherein said data extraction means identifies said tag frames; and wherein said data extraction means decodes and extracts said in-band data from said tag frames.

12. The apparatus of claim 11, wherein said video encoding means precedes said tag frame with a reset frame, said reset frame is generated as a total opposite of said tag frame.

13. The apparatus of claim 11, wherein said video encoding means fills in a pre-computed digital stream template representing a tag frame with some or all of said in-band data.

14. The apparatus of claim 11, wherein said tag frames enable frame accurate capture.

15. The apparatus of claim 11, wherein said data extraction means buffers a number of frames while decoding thereby allowing the use of said in-band data in a frame accurate manner.

16. An apparatus for encoding in-band data into analog video signals that is preserved through the transmission and digital conversion process in a computer environment, comprising:

video encoding means for encoding in-band data into an analog stream;

digital signal conversion means for converting said encoded analog stream into a formatted digital video stream;

a module for transmitting said formatted digital video stream;

a module for receiving said formatted digital video stream at a receiver;

data extraction means for decoding and extracting said in-band data from said formatted digital video stream;

wherein said video encoding means inserts and encodes tag frames into said analog stream;

wherein said digital signal conversion means converts said analog stream before or during execution of said transmitting module;

wherein said data extraction means identifies said tag frames; and wherein said data extraction means decodes and extracts said in-band data from said tag frames.

17. The apparatus of claim 16, wherein said video encoding means precedes said tag frame with a reset frame, said reset frame is generated as a total opposite of said tag frame.

18. The apparatus of claim 16, wherein said video encoding means fills in a pre-computed digital stream template representing a tag frame with some or all of said in-band data.

19. The apparatus of claim 16, wherein said in-band data enables frame accurate capture.

20. The apparatus of claim 16, wherein said data extraction means buffers a number of frames while decoding thereby allowing the use of said in-band data in a frame accurate manner.

* * * * *